(12) United States Patent
Luong et al.

(10) Patent No.: US 10,860,512 B2
(45) Date of Patent: Dec. 8, 2020

(54) PROCESSOR INTERCONNECT LINK TRAINING SYSTEM

(71) Applicant: Dell Products L.P., Round Rock, TX (US)

(72) Inventors: Anh Dinh Luong, Austin, TX (US); Isaac Qin Wang, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/396,183

(22) Filed: Apr. 26, 2019

(65) Prior Publication Data

US 2020/0341927 A1 Oct. 29, 2020

(51) Int. Cl.
*G06F 13/40* (2006.01)
*G06F 9/4401* (2018.01)

(52) U.S. Cl.
CPC ........ *G06F 13/4027* (2013.01); *G06F 9/4411* (2013.01)

(58) Field of Classification Search
CPC ............................ G06F 13/4027; G06F 9/4411
USPC ............................................................. 710/5
See application file for complete search history.

(56) References Cited

U.S. PATENT DOCUMENTS

| 6,633,628 | B1* | 10/2003 | Linder | H04M 3/30 379/1.04 |
|---|---|---|---|---|
| 7,480,808 | B2 | 1/2009 | Caruk et al. | |
| 7,532,642 | B1* | 5/2009 | Peacock | H04L 43/0864 370/468 |
| 9,720,838 | B2* | 8/2017 | Das Sharma | G06F 12/084 |
| 9,742,603 | B1* | 8/2017 | Bandi | H04L 7/10 |
| 10,684,670 | B2* | 6/2020 | Sanghi | G06F 9/4403 |
| 2004/0153778 | A1* | 8/2004 | Cheng | G06F 9/44505 714/25 |
| 2004/0218624 | A1* | 11/2004 | Kobayashi | G09G 5/006 370/463 |
| 2007/0008898 | A1 | 1/2007 | Sharma et al. | |
| 2011/0019762 | A1* | 1/2011 | Tsubota | H04L 1/0002 375/295 |
| 2012/0079162 | A1* | 3/2012 | Jaramillo | H04N 21/4367 710/316 |
| 2013/0103354 | A1* | 4/2013 | Berry, Jr. | G06F 11/349 702/186 |

(Continued)

Primary Examiner — Paul R. Myers
(74) Attorney, Agent, or Firm — Haynes and Boone, LLP

(57) ABSTRACT

A processing system interconnect link training system includes a processing system that includes a secondary processing subsystem that is coupled to a first primary processing subsystem and a second primary processing system which are coupled to each other via a processing system interconnect that includes a plurality of processing system links. The secondary processing subsystem trains, during a boot operation and according to a first link configuration, the plurality of processing system links. Then the secondary processing subsystem determines that the training of the plurality of processing system links fails and, in response, retrains the plurality of processing system links according to a second link configuration that is a downgraded configuration relative to the first link configuration. The second processing subsystem then determines that the retraining of the plurality of processing system links according to the second link configuration was successful and, in response, continues with the boot operation.

20 Claims, 6 Drawing Sheets

(56) References Cited

U.S. PATENT DOCUMENTS

| | | | |
|---|---|---|---|
| 2013/0103927 A1* | 4/2013 | Berry, Jr. | G06F 11/22 |
| | | | 712/30 |
| 2013/0159589 A1* | 6/2013 | Takayama | G06F 13/26 |
| | | | 710/307 |
| 2016/0092335 A1* | 3/2016 | Boelter | G06F 11/349 |
| | | | 714/47.1 |
| 2016/0147705 A1* | 5/2016 | Arroyo | G06F 13/4027 |
| | | | 714/15 |
| 2016/0210255 A1* | 7/2016 | Wicki | G06F 13/4022 |
| 2017/0168844 A1* | 6/2017 | Swanson | G06F 13/4282 |
| 2017/0289006 A1* | 10/2017 | Sato | H04L 43/10 |
| 2018/0004703 A1* | 1/2018 | Sharma | G06F 13/4072 |
| 2018/0316617 A1* | 11/2018 | Lubenski | H04W 40/248 |
| 2019/0386924 A1* | 12/2019 | Srinivasan | H04L 47/26 |

\* cited by examiner

PROCESSOR INTERCONNECT LINK TRAINING SYSTEM

BACKGROUND

The present disclosure relates generally to information handling systems, and more particularly to link training processor interconnects in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, include boot systems that operate to perform the boot operations that initialize the server device. For example, the boot system in some server devices utilizes a Central Processing Unit (CPU), along with a Serial Peripheral Interface (SPI) flash memory that is coupled to the CPU via a SPI interface and that stores firmware volumes that may be utilized to provide a Basic Input Output System (BIOS). Often, the CPU uses a secondary processor such as, for example, a Secure Processor™ (e.g., a Platform Security Processor™ (PSP)) available from AMD®, a Management Engine™ (ME) manufactured by Intel® Corp. of Santa Clara, Calif., and/or other secure processors known in the art for performing the early boot operations before the BIOS is provided by a primary processor (e.g., provided with a x86 architecture) that is configured with to complete the boot process. These early boot operations include training and initializing memory, training and initializing processor interconnect links, and/or other security functionality known in the art.

Processor interconnects may be provided between processor sockets included in a Non-Uniform Memory Access (NUMA) computer memory design in which each processor is provided a local memory that it can access quickly, with the processors coupled together via the processor interconnect (e.g., Inter-Chip Global Memory Interconnect (xGMI) available in processing systems provided by AMD®, Ultra-Path Interconnects (UPIs) available in processing systems provided by INTEL® Corporation of Santa Clara, Calif., United States, etc.) to allow the processors to access memory that is local to the other processors. The processor interconnect may include one or more processor links that may be trained and initialized by the secondary processor in order to configure them to operate in a predefined link configuration. For example, a predefined link configuration may define a predefined link width and a predefined link speed for processor links that are configurable to operate at different link speeds (e.g., 25 Gbps, 20 Gbps, or 16 Gbps), at different link widths (×16, ×8, ×4, ×2), and/or different operating modes (e.g., 4 links, 3 links, 2 links, or 1 link). In conventional systems, if the processor links do not train according to the predefined link configuration (e.g., the defined link width and/or link speed discussed above), the boot operation may stop, and conventional systems do not provide any means for recovering from such a boot operation failure. In systems in which one of the processor links is capable of being repurposed as a PCIe link and supports a cabled connection rather than a connection via traces on a printed circuit board, the training of the processor links can result in a relatively higher number of boot failures due to a loose or damaged cable connection.

Accordingly, it would be desirable to provide an improved processor interconnect link training system.

SUMMARY

According to one embodiment, an Information Handling System (IHS) includes a processing system; a memory system that is coupled to the processing system and that includes instructions that, when executed by the processing system, cause the processing system to provide a bootloader engine configured to: train, during a boot operation and according to a first link configuration, a plurality of processing system links included in a processing system interconnect; determine that the training of the plurality of processing system links according to the first link configuration has failed and, in response, retrain the plurality of processing system links according to a second link configuration that is a downgraded configuration relative to the first link configuration; and determine that the retraining of the plurality of processing system links according to the second link configuration was successful and, in response, continue with the boot operation.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
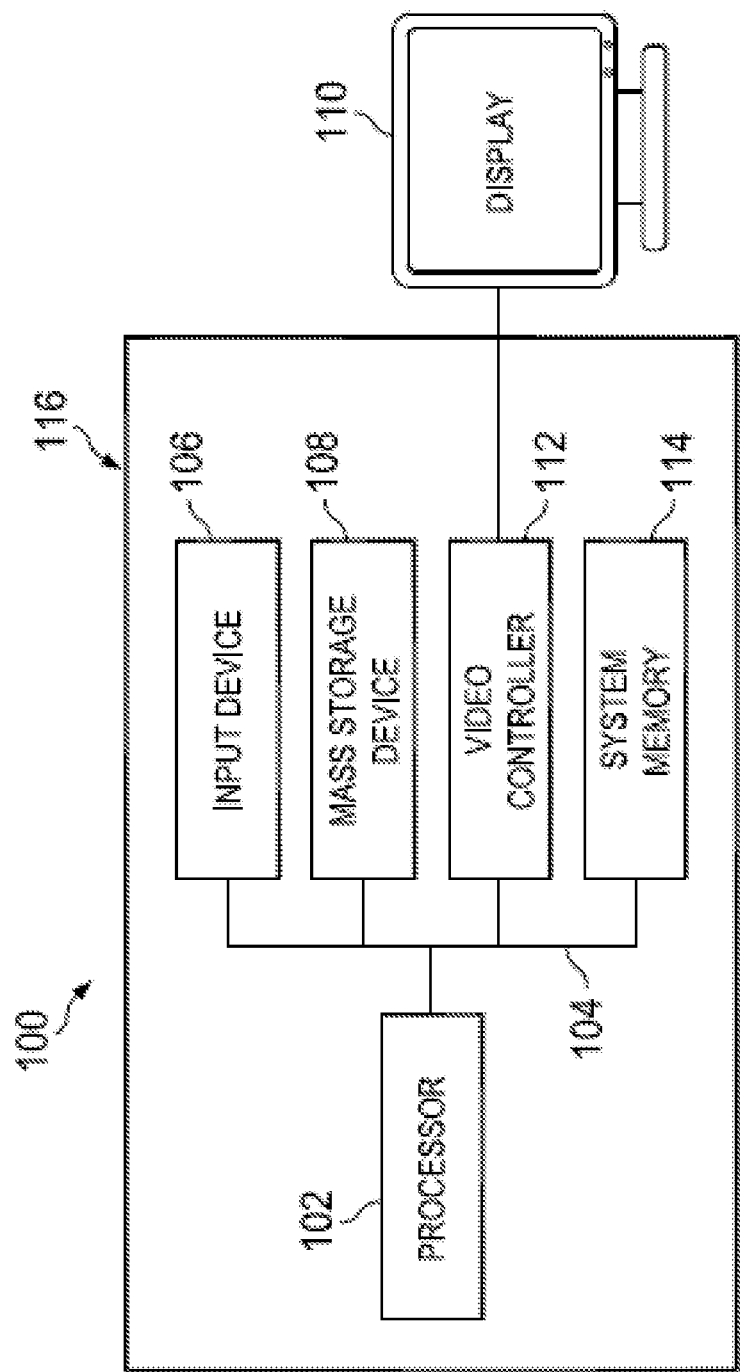
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
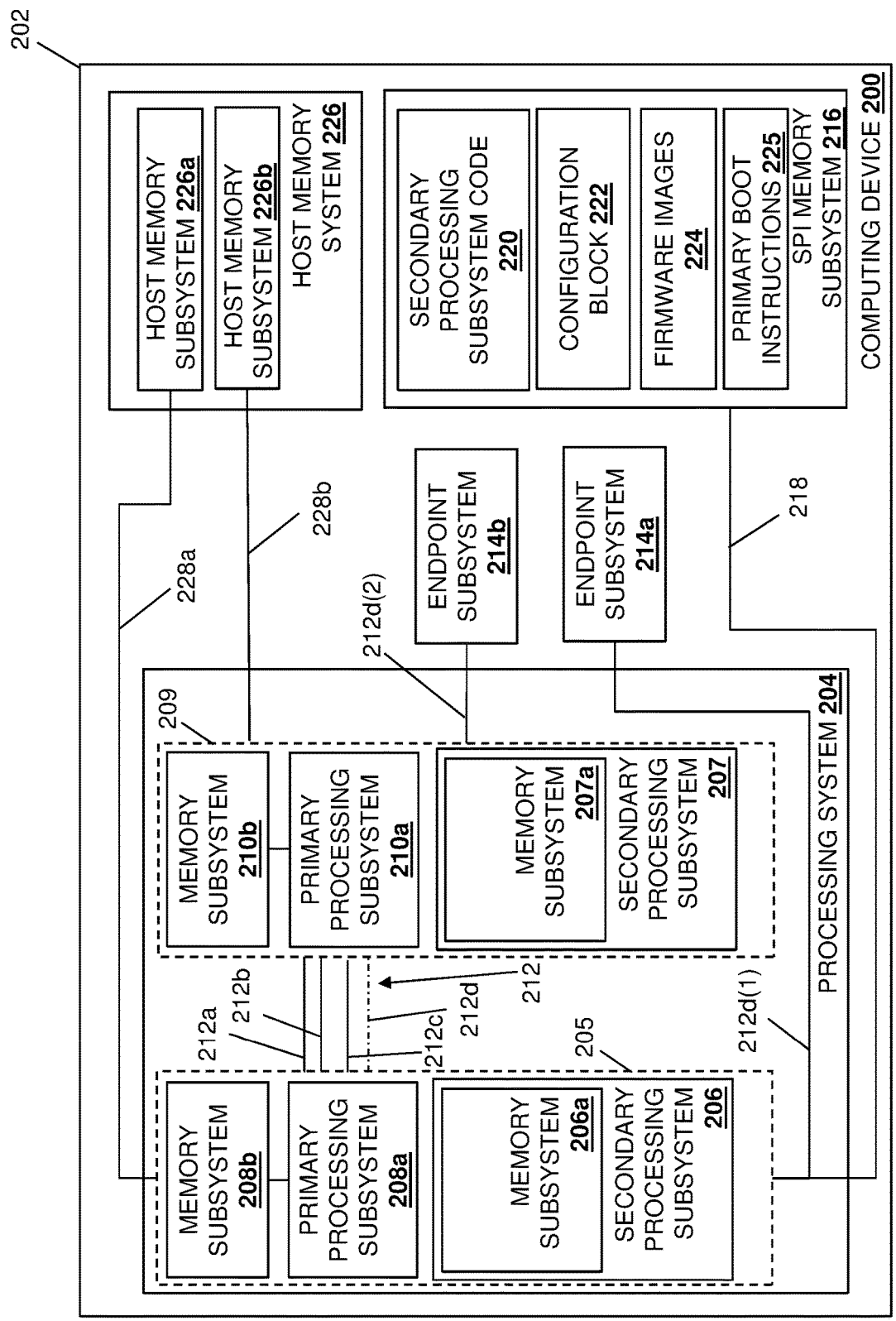
FIG. 2 is a schematic view illustrating an embodiment of a computing device that includes the processor interconnect link training system of the present disclosure.

Referring now to FIG. 2, an embodiment of a computing device 200 is illustrated that includes the processor interconnect link training system of the present disclosure. The computing device 200 may be provided by the IHS 100 discussed above with reference to FIG. 1 and/or may include some or all of the components of the IHS 100. Furthermore, while illustrated and discussed as a server device in some of the embodiments below, one of skill in the art in possession of the present disclosure will recognize that the functionality of the computing device 200 discussed below may be provided by networking devices, desktop computing devices, laptop/notebook computing devices, tablet computing devices, mobile phones, and/or other computing devices that are configured to operate similarly as discussed below. In the illustrated embodiment, the computing device 200 includes a chassis 202 that houses the components of the computing device 200, only some of which are illustrated below. For example, the chassis 202 may house a processing system 204 and a memory system (e.g., that may include the memory subsystems discussed below) that is coupled to the processing system and that includes instructions that, when executed by the processing system 204, cause the processing system to perform the functionality of the processing systems and/or computing devices discussed below.

In some examples, the processing system 204 may be a processing system included in one or more system on chip (SoC) device such as, for example, the NAPLES™ SoC manufactured by Advanced Micro Devices, Inc (AMD) of Santa Clara, Calif. However, one of skill in the art in possession of the present disclosure would recognize that the processing system 204 may be provided on other SoCs, and/or may include distinct systems that are coupled together by a communication bus, while remaining within the scope of the present disclosure. As illustrated in FIG. 2, the processing system 204 may include an SoC 205 and an SoC 209. The SoC 205 may also include a secondary processing subsystem 206 that is provided by a secure processor that is segregated, distinct from, and/or otherwise separate from the processor 102, discussed above with referent to FIG. 1, (e.g., a CPU) provided in the IHS 100 as part of the processing system 204. Likewise, the SoC 209 may include a second processing subsystem 207 that is provided by a secure processor that is segregated, distinct from, and/or otherwise separate from the processor 102, discussed above with referent to FIG. 1, (e.g., a CPU) provided in the IHS 100 as part of the processing system 204. In a specific example, the secondary processing subsystems 206 and/or 207 may be a Platform Security Processor (PSP) available from AMD® of Santa Clara, Calif., United States. The secondary processing subsystems 206 and 207 may include a memory subsystem 206a and 207a, respectively, that may be provided, in a specific example, by a PSP Random Access Memory (RAM). As would be understood by one of skill in the art in possession of the present disclosure, the secondary processing subsystem 206 and/or 207 may provide a trusted execution environment that operates to create, monitor, and maintain a security environment in the processing system 204 by managing a boot process for the computing device 200, initializing security-related mechanisms in the computing device 200, monitoring the computing device 200 for suspicious activities or events and implementing appropriate responses, initializing and training host memory and processing system interconnect links and/or performing other PSP functionality that would be apparent to one of skill in the art in possession of the present disclosure.

The secondary processing subsystem 206 and/or 207 may also include a plurality of components such as, for example, a dedicated microcontroller (e.g., an ARM® architecture based 32-bit microcontroller), an isolated on-chip ROM, interfaces to various memory systems (discussed below), hardware logic for providing for secure control of the initialization of a primary processing system, a cryptographic co-processor (which may include, for example, a random number generator (RNG), several engines to process standard cryptographic algorithms (AES, RSA, SHA, and other algorithms that would be apparent to one of skill in the art in possession of the present disclosure), a key storage block, and/or other cryptographic components/applications), an interface for accessing a video controller, a one-time password (OTP) for platform unique key material, and/or any other components that would be apparent to one of skill in the art in possession of the present disclosure. However, while discussed below as a PSP subsystem, in other examples the secondary processing subsystem 206 may be provided by the updated AMD® Platform Secure Processor (AMD-PSP), the INTEL® management engine (ME) available from INTEL® corporation of Santa Clara, Calif., United States, and/or other secure/boot processing subsystems that perform operation that occur prior to the execution of primary boot instructions (e.g., BIOS) provided via the primary processing system discussed below, and that would be apparent to one of skill in the art in possession of the present disclosure.

In the illustrated embodiment, the SoC 205 also includes a primary processing subsystem 208a. For example, the primary processing subsystem 208a may be configured according to the x86 architecture, which one of skill in the art in possession of the present disclosure will recognize may be provided by an instruction set architecture that is based on the INTEL® 8086 microprocessor and its 8088 variant (with additions and extensions that have been added in the decades since those microprocessors were introduced.) The primary processing subsystem 208a may include a plurality of processing subsystems (e.g. cores). In the illustrated embodiment, the SoC 209 also includes a primary processing subsystem 210a. For example, the primary processing subsystem 210a may be configured according to the x86 architecture, which one of skill in the art in possession of the present disclosure will recognize may be provided by an instruction set architecture that is based on the INTEL® 8086 microprocessor and its 8088 variant (with additions and extensions that have been added in the decades since those microprocessors were introduced.) The primary processing subsystem 210a may include a plurality of processing subsystems (e.g. cores). The primary processing subsystems 208a and 210a may be coupled together via processing subsystem interconnects such as an Inter-Chip Global Memory Interconnect (xGMI), an Ultra-Path Interconnect (UPI), or any other processing system interconnect that connects the sockets of the SoC 205 and the SoC 209. For example, in the illustrated embodiment, the primary processing subsystems 208a and 210a are coupled together via a processing system interconnect 212 that includes a plurality of processing system links 212a, 212b, and 212c.

In an embodiment, a link that is included in the processing system interconnect 212 and that may be configurable for use as a processing system link (e.g., the processing system link 212d indicated by the dashed line in FIG. 2) may be repurposed as an endpoint subsystem link (e.g., a PCIe endpoint link) for each primary processing subsystem 208a and 210a. In the illustrated example, a connector provided on a socket utilized in the processing subsystem 208a, which would otherwise be used to couple to a connector provided on a socket utilized in the processing subsystem 210a (e.g., via the processing system link 212d), is coupled to an endpoint subsystem 214a via an endpoint subsystem link 212d(1). Similarly, a connector provided on the socket utilized by the processing subsystem 210a, which would otherwise be used to couple to a connector provided on the socket utilized in the processing subsystem 208a (e.g., via the processing system link 212d), is coupled to an endpoint subsystem 214b via an endpoint subsystem link 212d(2). In an embodiment, the endpoint subsystem links 212d(1) and/or 212d(2) may include cables, traces, and/or other communication couplings that would be apparent to one of skill in the art in possession of the present disclosure. In other embodiments, the endpoint subsystems 214a and 214b may be provided by network card(s), video card(s), port expansion card(s), storage device(s), and/or any other endpoint device that would be apparent to one of skill in the art in possession of the present disclosure. While four processing system links 212a, 212b, 212c, and 212d are illustrated as being included in the processing system interconnect 212, one of skill in the art in possession of the present disclose will recognize that the processing system interconnect 212 may include any number of processing system links while remaining within the scope of the present disclosure.

Furthermore, each of the processing subsystems in the primary processing subsystems 208a and 210a may be provided with and connected to respective memory subsystems in memory subsystems 208b and 210b. For example, the processing subsystems and memory subsystems in the computing device 200 may utilize a Non-Uniform Memory Access (NUMA) computer memory design in which each respective processing subsystem is connected to a respective local memory subsystem to provide a respective NUMA node (i.e., a processing subsystem of the primary processing subsystem 208a and its memory subsystem of the local memory subsystem 208b provide a first NUMA node, a processing subsystem of the primary processing subsystem 210a and its memory subsystem of the local memory subsystem 210b provide a second NUMA node, and so on.) However, while two processing subsystems/memory subsystems (e.g., two NUMA nodes) are illustrated in FIG. 2, one of skill in the art in possession of the present disclosure will recognize that more processing subsystems/memory subsystems (e.g., NUMA nodes) may be provided according to the teachings of the present disclosure will fall within its scope as well. For example, each primary processing subsystem 208a and 210a may include a plurality of NUMA nodes Furthermore, while a specific processing system 204 is illustrated and described, one of skill in the art in possession of the present disclosure will recognize that a variety of different processing systems having different components and/or component configurations may provide the early boot event logging functionality of the present disclosure while remaining within its scope as well.

In the illustrated embodiment, the memory system in the computing device 200 includes a Serial Peripheral Interface (SPI) memory subsystem 216 that may be provided by, for example, an SPI flash memory device. The SPI memory subsystem 216 is coupled to the processing system 204 by an SPI interface 218. For example, the SPI interface 218 may be provided by an SPI Bus that connects the SPI flash memory device to the SoC 205. One of skill in the art in possession of the present disclosure will recognize that SPI flash memory devices are relatively small, lower-power flash memory devices that provide serial access to data stored thereon, and rather than addressing individual bytes, the SoC 205 may read or write contiguous groups of bytes in the address space of the SPI flash memory device serially, with the SPI Bus providing the typical protocol for accessing the SPI flash memory device. In the examples illustrated and described below, the SPI memory subsystem 216 stores secondary processing subsystem code 220 (e.g., PSP code), also referred to herein as early boot instructions, which may provide instructions for the secondary processing subsystem 206 to perform the functionality discussed below. In an embodiment, the secondary processing subsystem code 220 may include firmware to provide a bootloader engine such as, for example, an AMD Generic Encapsulated Software Architecture (AGESA)™ bootloader (ABL) that is provided by AMD's® PSP™, which may perform the functionality of the bootloader engine and/or secondary processing subsystems discussed below.

In the illustrated embodiment, the SPI memory subsystem 216 also stores a configuration block 222. The configuration block 222 may include a plurality of predefined configurations (e.g., link configurations for the processing system links) that may have been stored in the SPI memory subsystem 216 at build-time of the computing device 200. In an embodiment, the configuration block 222 may be provided by the AGESA™ Platform Customized Block (APCB), and/or any other configuration block that would be apparent to one of skill in the art in possession of the present disclosure. Furthermore, in the illustrated embodiment, the SPI memory subsystem 216 also stores a plurality of firmware images 224. As discussed below, the firmware images 224 include instructions that are configured to be executed by the primary processing system 208a in order to provide primary boot instructions 225 for the BIOS (e.g., an x86 BIOS) processes. One of skill in the art in possession of the present disclosure will recognize that the BIOS provided by the primary boot instructions may be provided via non-volatile firmware that is configured to perform hardware initialization during a booting process for the computing device 200, as well as provide runtime services for an operating system and/or other programs provided on the computing device 200. As would be understood by one of skill in the art in possession of the present disclosure, the BIOS may be provided as a Unified Extensible Firmware Interface (UEFI) BIOS. Thus, while UEFI is known in the art as a specification that has been provided to replace the conventional BIOS, and that defines a software interface between an operating system and platform firmware provided on computing devices, one of skill in the art in possession of the present disclosure will recognize that the discussions of the BIOS below apply to a UEFI BIOS as well.

In the illustrated embodiment, the memory system in the computing device 200 also includes a host memory system 226 that may be provided by, for example, Dynamic Random Access Memory (DRAM) devices and/or other memory devices that would be apparent to one of skill in the art in possession of the present disclosure. The host memory system 226 may include a host memory subsystem 226a that is accessible to the SoC 205 via a host memory interface 228a and may include a host memory subsystem 226b that is accessible to the SoC 209 via a host memory interface 228b. The SoC 205 may access the host memory subsystem 226b via the processing system interconnect 212. Similarly, the SoC 209 may access the host memory system 226a via the processing system interconnect 212. In some embodiments, the host memory subsystem 226 may be a memory subsystem that is trained and initialized by the secondary processing subsystem 206 before the primary processing subsystem 208a (via the BIOS) takes control of the boot operation. While a specific computing device 200 has been illustrated and described, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the functionality discussed below, while remaining within the scope of the present disclosure as well.

Figure 3:
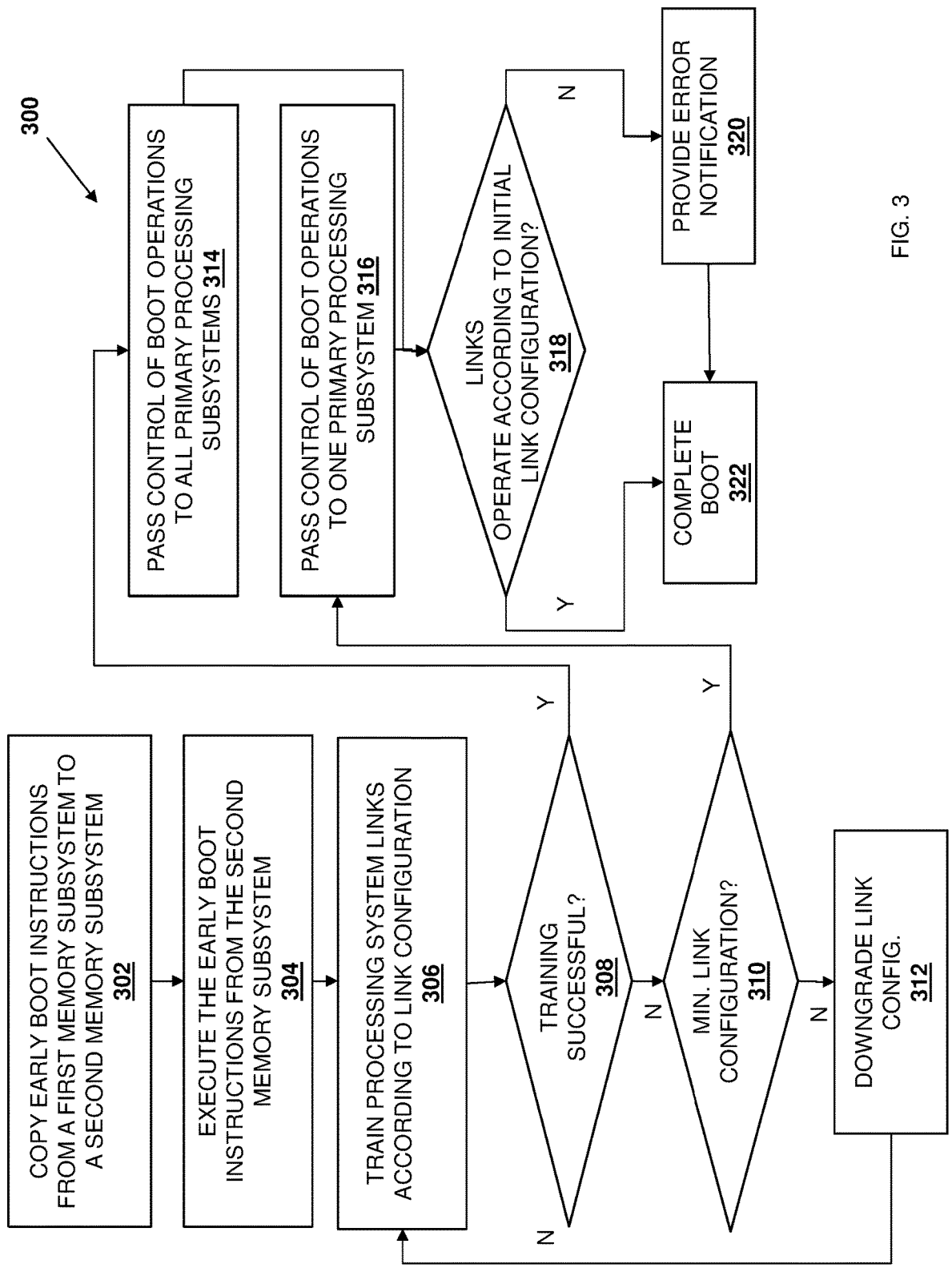
FIG. 3 is a flow chart illustrating an embodiment of a method for training processor links included in a processor interconnect.

Referring now to FIG. 3, an embodiment of a method for training processor interconnect links is illustrated. As discussed below, the systems and methods of the present disclosure provide a boot process that does not stop (e.g., "abort" and "hang") in the manner that occurs in conventional boot systems when training and initialization of processing system links included in a processing system interconnect does not occur according to a predefined link configuration. Such boot process failure prevention may be accomplished via a processing system in a computing device that downgrades link configurations provided for one or more processing system links in a processing system interconnect that fails to initialize according to a first link configuration until that processing system link initializes, or until all of the processing system links fail to initialize according to a minimum link configuration. In the event the processing system links are downgraded or fail to initialize according to the minimum link configuration the processing system will then hand off the boot process to the BIOS provided by a primary processing system, and that BIOS may operate the primary processing subsystems with the downgraded links, or operate only one of the primary processing subsystems (i.e., when the processing system links fail to initialize with minimum link configuration.) The BIOS may then determine whether the link configurations provided for the processing system links included in the processing system interconnect are operating a current link configuration that is provided in the predefined link configuration, and will provide a notification if the current link configuration does not correspond with the predefined link configuration.

Figure 4A:
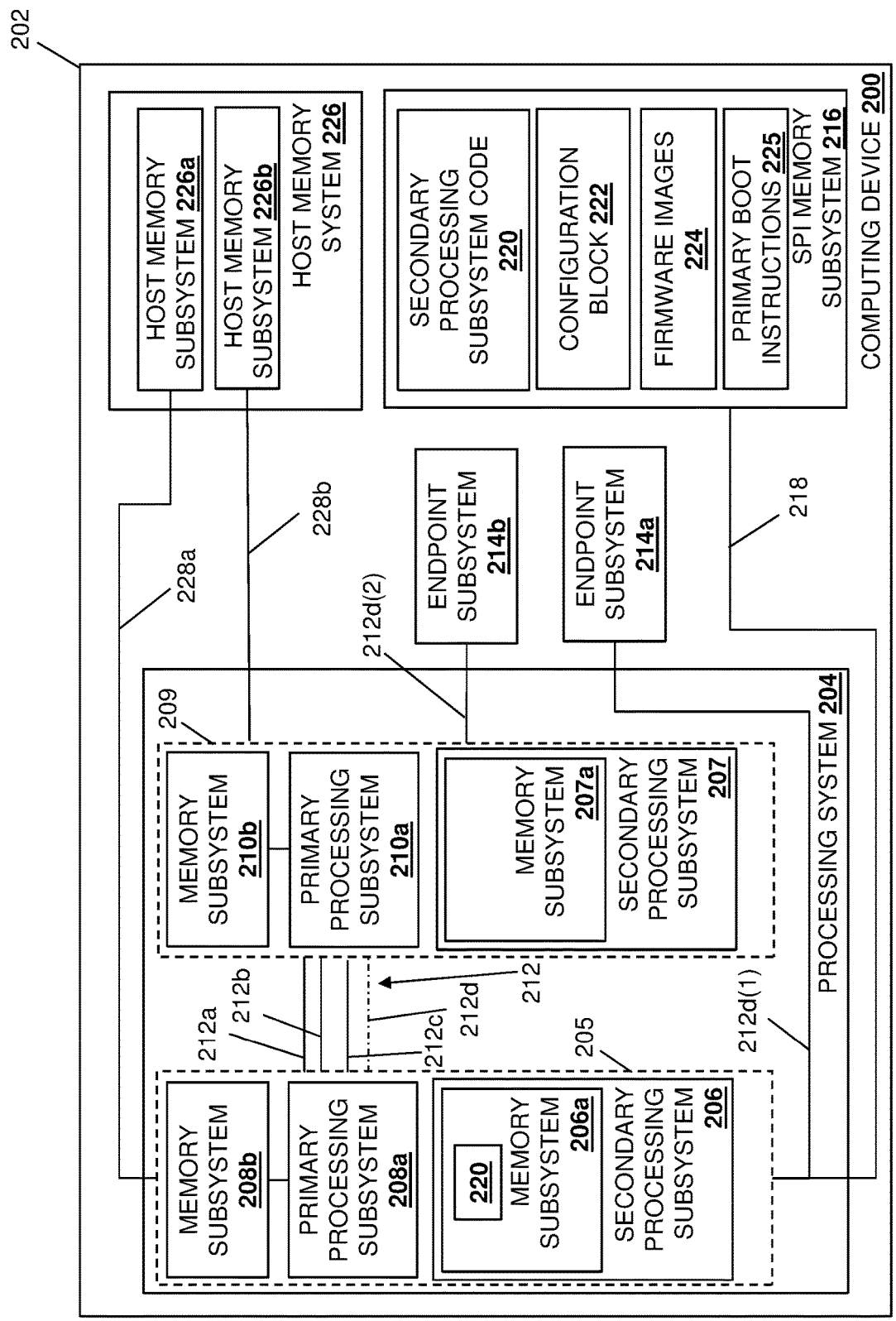
FIG. 4A is a schematic view illustrating an embodiment of the operations of the processor interconnect link training system in the computing device of FIG. 2 during the method of FIG. 3.

The method 300 begins at block 302 where early boot instructions are copied from a first memory subsystem to a second memory subsystem. In an embodiment, at or prior to block 302, the computing device 200 may be powered on, started up, reset, re-booted, and/or otherwise initialized in order to begin boot operations for the computing device 200. In an embodiment, when boot operations begin, the SRI memory subsystem 216 may be powered on, and an SRI interface performance level of the SRI interface 218 may be established. As such, at block 302, initialized portions of the processing system 204 (e.g., the secondary processing subsystem 206) operate to retrieve the secondary processing subsystem code 220 (e.g., PSP code) from the SRI memory subsystem 216 via the SRI interface 218 at that SRI interface performance level, and provide the secondary processing subsystem code 220 in the memory subsystem 206a (e.g., a PSP RAM), as illustrated in FIG. 4A. As discussed herein, the secondary processing subsystem code 220 may include early boot instructions that provide a portion of the boot instructions that enable the boot operations for the computing device 200.

As would be understood by one of skill in the art in possession of the present disclosure, the provisioning of the secondary processing subsystem code 220 in the memory subsystem 206a allows the secondary processing subsystem 206 to utilize the secondary processing subsystem code 220 (i.e., to provide a bootloader engine) in order to perform the secondary processing subsystem functionality discussed below. Furthermore, in addition to performing the operations discussed below, the secondary processing subsystem 206 may perform computing device configuration operations such as, for example, discovering the host memory subsystem 226, configuring a communications fabric for the computing device 200, and/or performing a variety of other PSP subsystem operations that would be apparent to one of skill in the art in possession of the present disclosure.

The method 300 then proceeds to block 304 where the early boot instructions are executed from the second memory subsystem. In an embodiment, at block 304, the secondary processing subsystem 206 may execute the secondary processing subsystem code 220 to perform memory and data initialization, load and execute the firmware images 224 (e.g., firmware for a trusted platform module (TPM)), perform validation of primary boot instructions 225 used by the primary processing subsystem 208a to complete the boot operations, discover and initialize the host memory subsystem 226, create a result of the configuration process to an output buffer in host memory subsystem 226, and/or perform any other early boot operations that would be apparent to one of skill in the art in possession of the present disclosure. As will be appreciated by one of skill in the art in possession of the present disclosure, the secondary processing subsystem 206 may continue to execute the secondary processing subsystem code 220 until the primary processing subsystem 208a is initialized which, in some embodiments, may occur after the primary boot instructions 225 have been validated by the secondary processing subsystem 206 and control of the boot operations has been handed off to the primary processing subsystem 208a.

The method 300 then proceeds to block 306 where a processing system link included in the processing system interconnect is initialized according to a first link configuration. In an embodiment, at block 306 and during the execution of the early boot instructions, the secondary processing subsystem 206 may reach, during execution of the secondary processing subsystem code 220, a portion of the secondary processing subsystem code 220 for training and initializing the processing system links 212a, 212b, 212c, and/or 212d included in the processing system interconnect 212. The secondary processing subsystem code 220 may then load the link configuration that is stored in the configuration block 222 of the SRI memory subsystem 216. As discussed above, the link configuration may be predefined in the configuration block 222 during a build-time of the computing device 200. In a specific example, the link configuration may include a number of links (e.g., 4 links of ×16, 3 links of ×16, 2 links of ×16, or 1 link of ×16), a link speed for each processing system link 212a, 212b, 212c, and/or 212d, and in some embodiments a link width. For example, the link configuration for the processing system links 212a, 212b, 212c, 212d may define link widths of ×16, ×8, ×4, ×2, and/or any other link width that would be apparent to one skill in the art in possession of the present disclosure. In addition, the link configuration for the processing system links 212a, 212b, 212c, and/or 212d may include link speeds of 25 Gbps, 20 Gbps, 16 Gbps, and/or any other link speed that would be apparent to one skill in the art in possession of the present disclosure.

In some embodiments, the secondary processing subsystem 206 executing the secondary processing subsystem code 220 may attempt to train and initialize the processing system links 212a, 212b, 212c, and/or 212d at the predefined link configuration. For example, each processing system link 212a, 212b, 212c, 212d may be trained at a link width of ×16 and a link speed of 25 Gbps, as defined in the link configuration stored in the configuration block 222. In an embodiment, if the processing system link 212d is repurposed as the endpoint subsystem links 212d(1) and 212d(2) as discussed above, the secondary processing subsystem 206 may not initialize and train the endpoint subsystem links 212d(1) and 212d(2) according to link configurations stored in configuration block 222 for the processing system links, but may instead initialize and train the endpoint subsystem links 212d(1) and 212d(2) according to link configurations for endpoint subsystem links that may also be stored in configuration block 222.

Figure 4B:
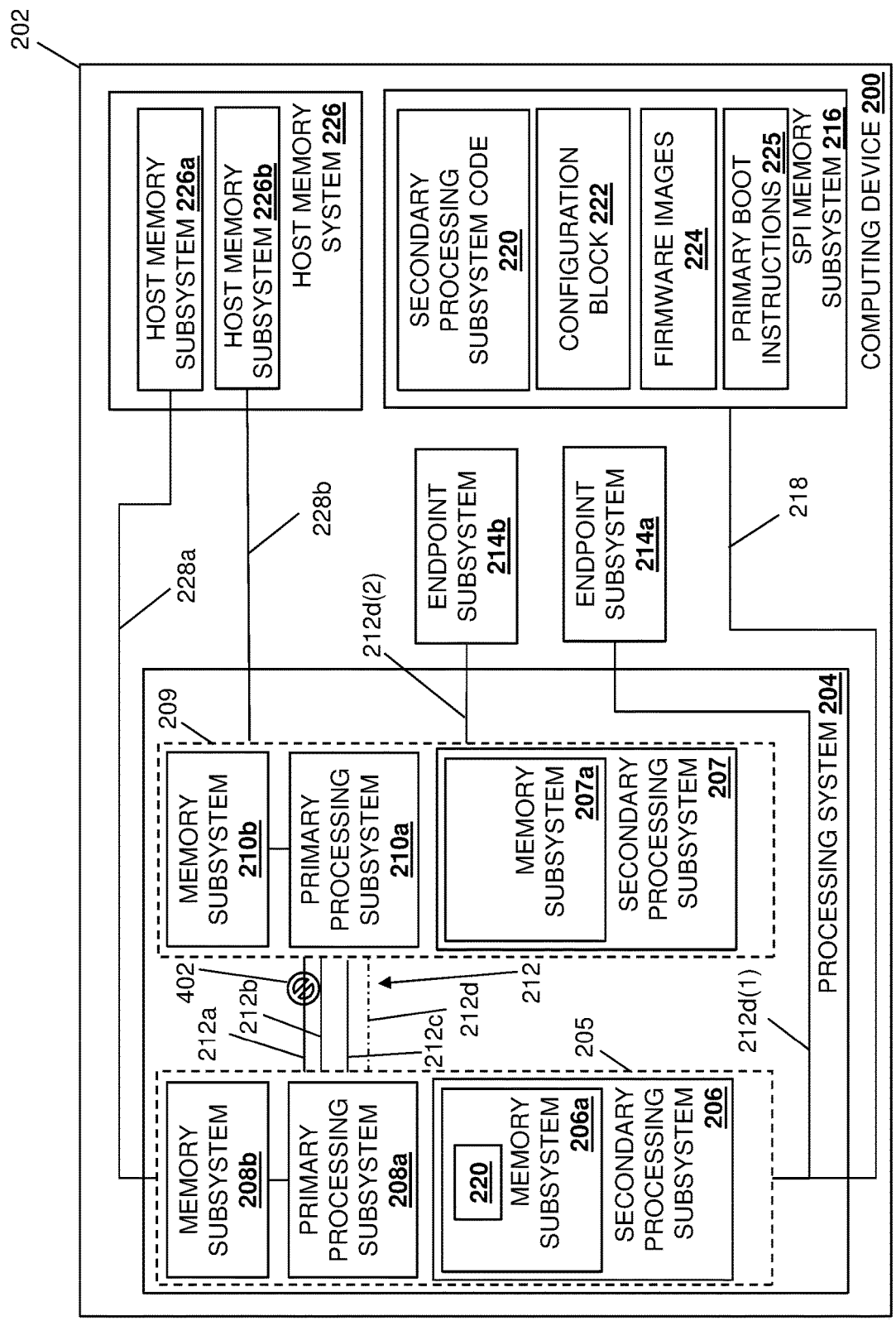
FIG. 4B is a schematic view illustrating an embodiment of the operations of the processor interconnect link training system in the computing device of FIG. 2 during the method of FIG. 3.

The method 300 then proceeds to decision block 308 where it is determined whether the training of the links in the processing system interconnect succeeded. In an embodiment, at decision block 308, the secondary processing subsystem 206 may determine whether the processing system links 212a, 212b, 212c, and 212d were trained successfully. For example, the secondary processing subsystem 206 may be configured to detect whether a failure occurs on any of the processing system links 212a, 212b, 212c, or 212d during their training by, for example, determining whether a link failed training at a configured link width and/or whether a link failed training at a configured link speed. Referring to the example in FIG. 4B, the processing system link 212a may have been successfully trained at the link width defined the first link configuration, but may have failed training at the link speed defined by the first link configuration, which would result in a determination of a link training failure 402 of the processing system link 212a at decision block 308. Likewise, the processing system link 212a may have been successfully trained at the link speed defined by the first link configuration, but may have failed training at the link width defined by the first link configuration, which would result in the determination of the link training failure 402 of the processing system link 212a at decision block 308. One of skill in the art will recognize that, in other examples, links may fail link training at both the link width and the link speed defined by the first link configuration, and one or more of the processing system links 212b, 212c, and/or 212d may fail link training at the link width and/or link speed defined by the first link configuration as well.

If any of the processing system links 212a, 212b, 212c, and/or 212d fail link training, the method 300 proceeds to decision block 310 where it is determined whether the current link configuration is a minimum link configuration for the processing system interconnect 212. In an embodiment, at decision block 310, the secondary processing subsystem 206 may determine whether the current link configuration is a minimum link configuration, which may be a link configuration from which the processing system links 212a, 212b, 212c, and 212d cannot be downgraded any further. For example, the minimum link configuration may exist for any of the processing system links 212a, 212b, 212c, and 212d when that link is configured with a link width of ×1 and a link speed of 10 Gbps, although one of skill in the art in possession of the present disclosure will recognize that other minimum link configurations will fall within the scope of the present disclosure as well. For example, the link widths for any of the processing system links 212a, 212b, 212c, and 212d may not be adjustable such that ×16 is the highest and lowest link width that any of the processing system links 212a, 212b, 212c, and 212d may be trained at.

If, at decision block 310, it is determined that the link configuration is not the minimum link configuration, then the method 300 may proceed to block 312 where the link configuration for the processing system link that failed is downgraded. In an embodiment, at block 312, the secondary processing subsystem 206 may downgrade the link configuration for the processing system link that failed at decision block 308 such that a new link configuration is selected for that processing system link that is a downgraded link configuration relative to the first link configuration. For example, if the processing system link failed link training at a particular link speed, the secondary processing subsystem 206 may downgrade the link speed of the processing system link that failed to the next lowest link speed that processing system link is configurable to operate at, while leaving the link width for that processing system link the same. In another example, if the processing system link failed link training at a particular link width, the secondary processing subsystem 206 may downgrade the link width of the processing system link that failed to the next lowest link width that processing system link is configurable to operate at, while leaving the link speed the same. The various number of links, link widths, and link speeds may be selected from predefined values in the configuration block 222. Referring to the example discussed above with reference to FIG. 4B, the processing system link 212a may be downgraded from having been provided a configuration with a link speed of 25 Gbps to selecting a configuration with a link speed of 20 Gbps (i.e., in the situation where the processing system link 212a failed to train and initialize at a link speed of 25 Gbps that was provided in the first/predefined link configuration in the configuration block 222.)

The method 300 may proceed back to block 306 where the processing system links of the processing system interconnect are retrained with the second link configuration that was selected after the link configuration downgrade discussed above. As such, the method 300 may repeat blocks 306, 308, 310, and 312 until either the link training is successful, or all of the processing system links 212a, 212b, 212c and, in some embodiments, 212d that provide the processing system interconnect are at the minimum link configuration. If a processing system link 212a, 212b, 212c and/or 212d fails to train and is determined to be at its minimum link configuration at decision block 310 (i.e., such that that processing system link 212a, 212b, 212c and/or 212d cannot be downgraded further) but the other processing system link(s) 212a, 212b, 212c and/or 212d have successfully trained and initialized, then the secondary processing subsystem 206 may mark that processing system link as a failed link when the method 300 is at block 312, and discontinue trying to initialize and train that processing system link when the method 300 proceeds to block 306. For example, if the processing system link 212a fails to train and initialize at its minimum link configuration and according to one of a minimum link speed and/or in some embodiments a minimum link width, the secondary processing subsystem 206 may discontinue training and initializing the processing system link 212a at further performances of block 306 (i.e., on further iterations of the method 300). In such an example, the secondary processing subsystem 206 would operate to train the processing system links 212b, 212c, and/or 212d according to their respective link configuration(s) at block 306.

Referring again to decision block 308, if it is determined that the link training was successful at decision block 308, then the method 300 may proceed to block 314 where control of the boot operations is passed to the primary processing system. In an embodiment, at block 314 and after successful link training of the processing system links 212a, 212b, 212c, and/or 212d, the secondary processing subsystem 206 may complete its boot operations. For example, the processing system 204 may determine whether the secondary processing subsystem code 220 that includes the early boot instructions has been fully executed such that the primary processing systems 208a and 210a are initialized and takes over control of the boot operations in order to allow for the provisioning of the primary boot instructions 225 that provides the BIOS. As such, the secondary processing subsystem 206 provides control of the boot operations to the primary processing systems 208a and 210a, which results in the primary processing systems 208a and 210a executing the primary boot instructions 225 to perform the BIOS processes that result in the loading of an operating system and/or other boot operations that would be apparent to one of skill in the art in possession of the present disclosure. With at least one of the processing system links between the primary processing subsystem 208a and the primary processing subsystem 210a trained and initialized, the primary processing systems 208a and 210a may execute the primary boot instructions 225 to perform the BIOS processes. However, while a specific example of the completion of the execution of early boot instructions has been provided, one of skill in the art in possession of the present disclosure will recognize that early boot instruction execution may be completed in a variety of manners that will fall within the scope of the present disclosure as well.

Figure 4C:
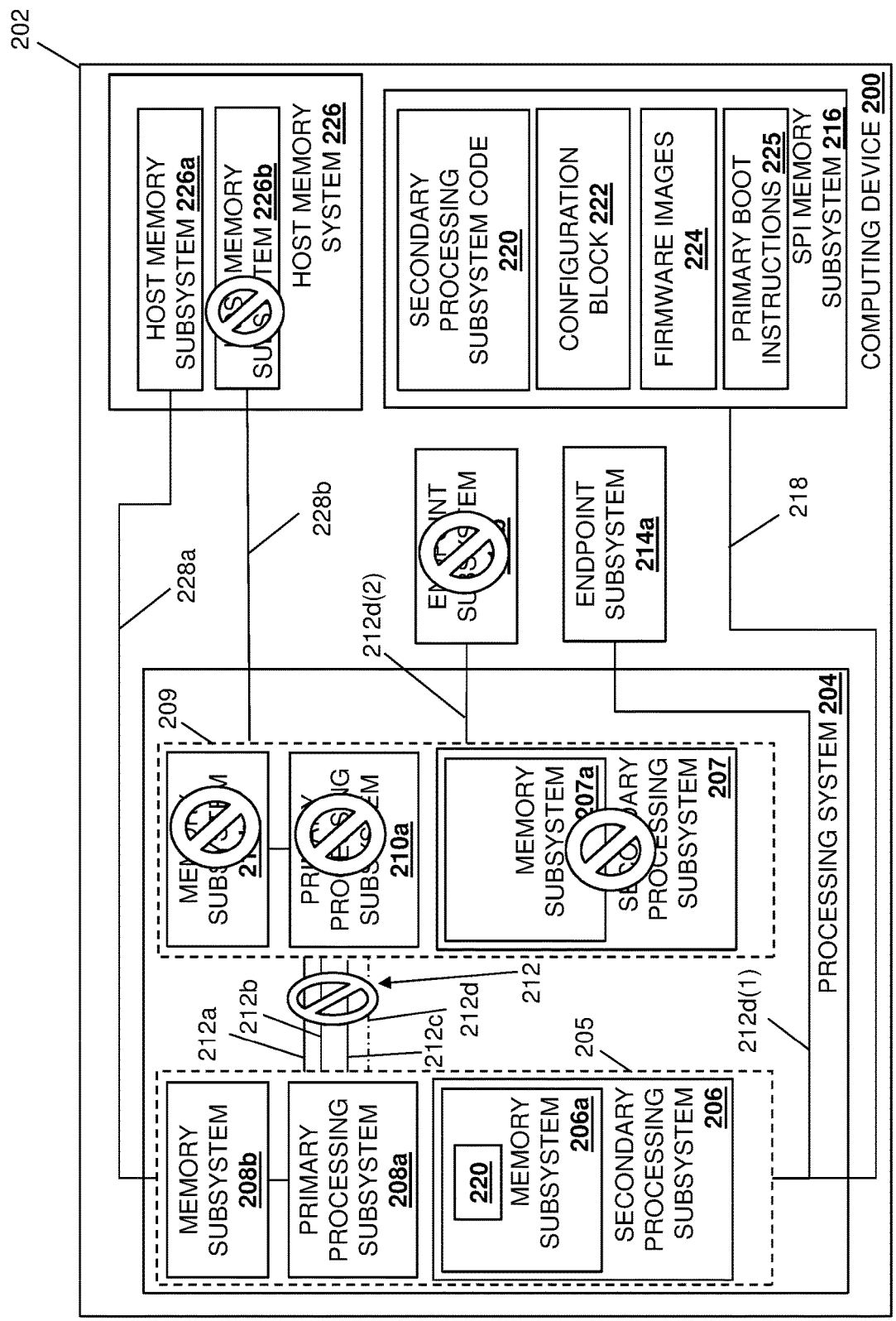
FIG. 4C is a schematic view illustrating an embodiment of the operations of the processor interconnect link training system in the computing device of FIG. 2 during the method of FIG. 3.

Referring again to decision block 310, if it is determined that the link training was unsuccessful at decision block 308 with the processing system links provided the minimum link configuration in the link training attempt performed for the processing subsystem interconnect 212, the method 300 may proceed to block 316 where control of the boot operations is passed to the primary processing subsystem. In an embodiment, at block 316, after unsuccessful link training of the processing system links 212a, 212b, 212c, and/or 212d, the secondary processing subsystem 206 may complete its boot operations, and the processing system 204 may determine whether the secondary processing subsystem code 220 that includes the early boot instructions has been fully executed to allow a BIOS to be provided that performs primary boot instructions 225. As such, the secondary processing subsystem 206 may provide control of the boot operations to the primary processing system 208a, which results in the primary processing system 208a executing the primary boot instructions 225 to perform the BIOS processes that result in the loading of an operating system and/or other boot operations that would be apparent to one of skill in the art in possession of the present disclosure. However, when none of the processing system links 212a, 212b, 212c, and/or 212d in the processing system interconnect 212 between the primary processing subsystem 208a and the primary processing subsystem 210a were successfully trained and initialized, as illustrated in FIG. 4C, only the primary processing subsystem 208a included in the SoC 205 is available to execute the primary boot instructions 225 to perform the BIOS processes. As such, when all of the processing system links 212a, 212b, 212c, and 212d included in the processing system interconnect 212 fail to train and initialize at the minimum configuration, then one of the primary processing subsystems 208a on the SoC 205 may be handed control of the boot process to complete the boot process and report the link training errors experienced by the processing system interconnect 212, discussed below. However, while a specific example of the completion of the execution of early boot instructions has been provided, one of skill in the art in possession of the present disclosure will recognize that early boot instruction execution may be completed in a variety of manners that will fall within the scope of the present disclosure as well.

The method 300 may proceed from block 314 or block 316 to decision block 318 where it is determined whether the link configuration of the processing system links included in the processing system interconnect operate according to the first link configuration. In an embodiment, at decision block 318, the primary processing systems 208a and/or 210a may determine whether the processing system links 212a, 212b, 212c, and/or 212d are operating according to the link configuration stored in the configuration block 222. For example, the primary processing system 208a and/or 210a may compare the current link configuration of the processing system links 212a, 212b, 212c, and/or 212d to the link configuration stored in the configuration block 222, and determine whether there are any differences between the two.

If at decision block 318, the link configuration of one or more of the processing system links in the processing system interconnect are not operating according to the first link configuration, then the method 300 proceeds to block 320 where a processing system interconnect downgraded link notification is provided that indicates that one or more of the processing system links in the processing system interconnect was downgraded. In one embodiment at decision block 318, the primary processing systems 208a and/or 210a may provide a processing system interconnect downgraded link notification (e.g., via the BIOS) that identifies the downgraded link to a user of the computing device 200. For example, the primary processing systems 208a and/or 210a may log the processing system interconnect downgraded link notification in a log file that is stored in a BIOS storage and/or the host memory subsystem 226, and the user may retrieve the log file to receive the processing system interconnect downgraded link notification. In other examples, if the primary processing systems 208a and/or 210a has initialized a display system included in the computing device 200, the primary processing systems 208a and/or 210a may provide the processing system interconnect downgraded link notification (via the BIOS) for display on a graphical user interface during the boot process and/or once an operating system has been loaded.

For example, the processing system interconnect downgraded link notification may identify to the user the processing system link that is operating with a downgraded link configuration, as well as information about the processing system link such as, for example, the maximum link width, the maximum link speed, the working link width(s), the working link speed(s), the negotiated link width, the current link speed, the number of links operating, troubleshooting procedures, technical support contact information, and/or any other information that would be apparent to one of skill in the art in possession of the present disclosure as providing information that may help the user diagnose and resolve the downgraded processing system link. While several specific examples of presenting a processing system interconnect downgraded link notification to the user of the computing device 200 have been discussed, one of skill in the art in possession of the present disclosure will recognize that the processing system interconnect downgraded link notification may be presented to the user in a wide variety of manners such as, for example, via a user device (e.g., a mobile phone) coupled to the computing device 200, via a visual indicator (e.g., one or more LEDs) located on the computing device 200, via an audio indicator (e.g., a speaker system) located on the computing device 200, and/or in other manners while remaining within the scope of the present disclosure as well.

If, at decision block 318, it is determined that the processing system links in the processing system interconnect are operating according to the first link configuration, or following the provisioning of the processing system interconnect downgraded link notification at block 320, the method 300 proceeds to block 322 where the boot process advances. In an embodiment of block 322, the primary processing systems 208a and/or 210a may advance the boot operation performed by the BIOS to the next boot instruction. In some examples, the primary processing systems 208a and/or 210a may advance through the boot process until the boot process is completed (i.e., execution of the primary boot instructions 225) and the BIOS causes an operating system to load such that the server device 200 enters runtime operations.

Thus, systems and methods have been described that provide for the training of processing system links included in a processing system interconnect, as well as the reporting of downgraded link configurations for those links if they exist following the link training. The systems and methods of the present disclosure provide a boot process that does not abort and hang when link training and initialization of the processing system links in the processing system interconnect fails, which may be accomplished via a processing system in a computing device that downgrades link configuration(s) provided to processing system link(s) that fail to initialize until those processing system link(s) initialize or fail to initialize at a minimum link configuration. When the boot system hands off the boot process to the BIOS following the link training and/or downgrading discussed above, the BIOS may operate two or more primary processing subsystems with downgraded links, or may operate one primary processing subsystem in the event all of the processing system links failed to initialize with the minimum link configuration. During the boot process performed by the primary processing subsystem(s), the BIOS will determine whether the link configurations of the processing system links are operating according to the initial link configuration, and will provide a processing system interconnect downgraded link notification to a user if the processing system link(s) are not operating according to that initial link configuration. As such, the systems and methods of the present disclosure provide a processing system with the ability to complete a boot process even if one or more processing system links in the processing system interconnect fail to train and initialize at their initial link configuration during an early boot process and before a primary processing subsystem initializes and takes control of the boot process. Once the primary processing subsystem initializes such that the BIOS takes control of the boot process, the BIOS may notify the user of any downgraded links in order to allow the user to troubleshoot the reason for those downgraded link(s).

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A processing system interconnect link training system, comprising:
   a processing system that includes:
      a first primary processing subsystem;
      a second primary processing subsystem that is coupled to the first primary processing subsystem via a processing system interconnect that includes at least one processing system link; and
      a secondary processing subsystem that is coupled to the first primary processing subsystem, wherein the secondary processing subsystem is configured to:
         train, during a boot operation performed using early boot instructions that are executed prior to the execution of primary boot instructions by a Basic Input/Output System (BIOS) and according to a first link configuration, the at least one processing system link;
         determine, as part of the boot operation performed using the early boot instructions, that the training of the at least one processing system link according to the first link configuration has failed and, in response, retrain the at least one processing system link according to a second link configuration that is a downgraded configuration relative to the first link configuration; and determine, as part of the boot operation performed using the early boot instructions, that the retraining of the at least one processing system link according to the second link configuration was successful and, in response, continue with the boot operation.

2. The system of claim 1, wherein the secondary processing subsystem is configured to:

pass control of the boot operation to the first primary processing subsystem and the second primary processing subsystem that provide the BIOS to execute the primary boot instructions in response to completing the early boot instructions for the secondary processing subsystem.

3. The system of claim 2, wherein at least one of the first primary processing subsystem and the second primary processing subsystem is configured to:

determine, during the boot operation performed via the execution of the primary boot instructions by the BIOS, that the at least one processing system link operates at the first link configuration and, in response, complete the boot operation.

4. The system of claim 2, wherein at least one of the first primary processing subsystem and the second primary processing subsystem is configured to:

determine, during the boot operation performed via the execution of the primary boot instructions by the BIOS, that the at least one processing system link does not operate at the first link configuration and, in response, provide a notification that the at least one processing system link is downgraded and complete the boot instructions.

5. The system of claim 1, further comprising:

an endpoint subsystem coupled to the first primary processing subsystem via a repurposed processing system link that is included in the at least one processing system link.

6. The system of claim 5, wherein the repurposed processing system link is provided by a cable.

7. The system of claim 1, wherein the secondary processing subsystem is configured to:

determine that the second link configuration is a minimum link configuration;

determine that the training of the at least one processing system link according to the second link configuration has failed; and pass, in response to the determining the second link configuration is the minimum link configuration and that the training of the at least one processing system link according to the second link configuration has failed, control of the boot operation to the first primary processing subsystem.

8. An Information Handling System (IHS), comprising:

a processing system;

a memory system that is coupled to the processing system and that includes instructions that, when executed by the processing system, cause the processing system to provide a bootloader engine configured to:

train, during a boot operation performed using early boot instructions that are executed prior to the execution of primary boot instructions by a Basic Input/ Output System (BIOS) and according to a first link configuration, a at least one processing system link included in a processing system interconnect that couples a first primary processing subsystem with a second primary processing subsystem;

determine, as part of the boot operation performed using the early boot instructions, that the training of the at least one processing system link according to the first link configuration has failed and, in response, retrain the at least one processing system link according to a second link configuration that is a downgraded configuration relative to the first link configuration; and determine, as part of the boot operation performed using the early boot instructions, that the retraining of the at least one processing system link according to the second link configuration was successful and, in response, continue with the boot operation.

9. The IHS of claim 8, wherein the bootloader engine is configured to:

pass control of the boot operation to the first primary processing subsystem and the second primary processing subsystem that provide the BIOS engine to execute the primary boot instructions, in response to completing the early boot instructions.

10. The IHS of claim 9, wherein the memory system that is coupled to the processing system and that includes the instructions that, when executed by the processing system, cause the processing system to provide the BIOS engine that is configured to:

determine, during the boot operation and using the primary boot instructions, that the at least one processing system link operates at the first link configuration and, in response, complete the boot operation.

11. The IHS of claim 9, wherein the memory system that is coupled to the processing system and that includes the instructions that, when executed by the processing system, cause the processing system to provide the BIOS engine that is configured to:

determine, during the boot operation and using the primary boot instructions, that the at least one processing system link does not operate at the first link configuration and, in response, provide a notification that the at least one processing system link is downgraded and complete the boot instructions.

12. The IHS of claim 8, further comprising:

an endpoint subsystem coupled to the processing system via a repurposed processing system link that is included in the at least one processing system link.

13. The IHS of claim 12, wherein the repurposed processing system link is provided by a cable.

14. The IHS of claim 8, wherein the bootloader engine is configured to:

determine that the second link configuration is a minimum link configuration;

determine that the training of the at least one processing system link according to the second link configuration has failed; and pass, in response to the determining the second link configuration is the minimum link configuration and that the training of the at least one processing system link according to the second link configuration has failed, control of the boot operation to the first primary processing subsystem.

15. A method of training processing system interconnect links, comprising:

training, by a processing system during a boot operation performed using early boot instructions that are executed prior to the execution of primary boot instructions by a Basic Input/Output System (BIOS) and according to a first link configuration, a plurality of processing system links included in a processing system interconnect that couples a first primary processing subsystem to a second primary processing subsystem;

determining, by the processing system as part of boot operation performed using the early boot instructions, that the training of the plurality of processing system links according to the first link configuration has failed and, in response, retraining the plurality of processing system links according to a second link configuration that is a downgraded configuration relative to the first link configuration; and determining, by the processing system as part of boot operation performed using the early boot instructions, that the retraining of the plurality of processing system links according to the second link configuration was successful and, in response, continue with the boot operation.

16. The method of claim 15, further comprising:

passing, by the processing system, control of the boot operation to the first primary processing subsystem and the second primary processing subsystem that provide the BIOS to execute the primary boot instructions, in response to completing the early boot instructions for a secondary processing subsystem.

17. The method of claim 16, further comprising:

determining, by the processing system during the boot operation performed via the execution of the primary boot instructions by the BIOS, that the at least one processing system link operates at the first link configuration and, in response, completing the boot operation.

18. The method of claim 16, further comprising:

determining, by the processing system during the boot operation performed via the execution of the primary boot instructions by the BIOS, that the at least one processing system link does not operate at the first link configuration and, in response, providing a notification that the plurality of processing system links is downgraded; and completing the boot instructions.

19. The method of claim 15, further comprising:

determining, by the processing system, that the second link configuration is a minimum link configuration;

determining, by the processing system, that the training of the at least one processing system link according to the second link configuration has failed; and passing, by the processing system and in response to the determining the second link configuration is the minimum link configuration and that the training of the at least one processing system link according to the second link configuration has failed, control of the boot operation to only the first primary processing subsystem.

20. The method of claim 15, further comprising:

determining, by the processing system, that the second link configuration is a minimum link configuration;

determining, by the processing system, that the training of a first processing system link of the at least one processing system link according to the second link configuration has failed and that a second processing system link of the at least one processing system link has succeed; and passing, by the processing system and in response to the determining the second link configuration is the minimum link configuration and that the training of the first processing system link has failed and the second processing system link has succeeded, control of the boot operation to the first primary processing subsystem and the second primary processing subsystem.

* * * * *